(12) United States Patent
Forte et al.

(10) Patent No.: US 9,587,092 B2
(45) Date of Patent: Mar. 7, 2017

(54) TYRE PORTIONS HIGHLY IMPERMEABLE TO OXYGEN

(71) Applicant: BRIDGESTONE CORPORATION, Tokyo (JP)

(72) Inventors: Gianluca Forte, Rome (IT); Paolo Fiorenza, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/652,319

(22) PCT Filed: Dec. 19, 2013

(86) PCT No.: PCT/IB2013/061156
§ 371 (c)(1),
(2) Date: Jun. 15, 2015

(87) PCT Pub. No.: WO2014/097220
PCT Pub. Date: Jun. 26, 2014

(65) Prior Publication Data
US 2015/0322248 A1   Nov. 12, 2015

(30) Foreign Application Priority Data

Dec. 19, 2012 (IT) .............................. RM2012A0649
Mar. 25, 2013 (IT) .............................. RM2013A0176

(51) Int. Cl.
| | |
|---|---|
| C08L 15/02 | (2006.01) |
| B60C 1/00 | (2006.01) |
| C08L 7/00 | (2006.01) |
| C08L 21/00 | (2006.01) |
| C08K 5/151 | (2006.01) |
| C08K 5/1545 | (2006.01) |

(52) U.S. Cl.
CPC ................ *C08L 15/02* (2013.01); *B60C 1/00* (2013.01); *B60C 1/0008* (2013.04); *B60C 1/0016* (2013.04); *C08K 5/151* (2013.01); *C08K 5/1545* (2013.01); *C08L 7/00* (2013.01); *C08L 21/00* (2013.01); *B60C 2001/0058* (2013.04); *B60C 2001/0066* (2013.04); *C08L 2205/02* (2013.01)

(58) Field of Classification Search
CPC ...... C08K 5/1535; C08K 5/1545; C08L 15/00
See application file for complete search history.

(56) References Cited

U.S. PATENT DOCUMENTS

| | | | |
|---|---|---|---|
| 6,107,372 A | 8/2000 | Sakamaki | |
| 6,228,908 B1 * | 5/2001 | Takeichi | B60C 1/0016 524/111 |

FOREIGN PATENT DOCUMENTS

| | | |
|---|---|---|
| EP | 1 086 830 A2 | 3/2001 |
| EP | 1 788 021 A1 | 5/2007 |

OTHER PUBLICATIONS

International Search Report of PCT/IB2013/061156 dated Apr. 2, 2014.
Written Opinion of the International Searching Authority of PCT/IB/2013/061156 dated Apr. 2, 2014.

* cited by examiner

*Primary Examiner* — Wenwen Cai
(74) *Attorney, Agent, or Firm* — Sughrue Mion, PLLC

(57) ABSTRACT

A tire portion selected from the group including an innerliner, tread ply skim, TBR body ply skim, bead reinforcing skim, undertread, tie gum, squeegee, folded edge gum strip, belt edge gum strip and tread ply insert, and made from a compound including a polymer base and curing agents. The compound also includes a carbohydrate having 2 to 30 repetitive, possibly substituted, units.

4 Claims, No Drawings

TYRE PORTIONS HIGHLY IMPERMEABLE TO OXYGEN

CROSS REFERENCE TO RELATED APPLICATIONS

This is a National Stage of International Application No. PCT/IB2013/061156 filed Dec. 19, 2013, claiming priority based on Italian Patent Application No. RM2012A000649 filed Dec. 19, 2012 and Italian Patent Application No. RM2013A000176 filed Mar. 25, 2013, the contents of all of which are incorporated herein by reference in their entirety.

TECHNICAL FIELD

The present invention relates to tyre portions highly impermeable to oxygen. The tyre portions considered in the present invention are innerliners, and the portions incorporating metal reinforcing cords, such as the tread ply skim, TBR body ply skim, bead reinforcing skim, undertread, tie gum, squeegee, folded edge gum strip, belt edge gum strip, and tread ply insert.

BACKGROUND ART

Here and hereinafter, 'innerliner' is intended to mean an inner layer of rubber substantially impermeable to air and used in tubeless tyres, i.e. tyres with no inner tube, to maintain air pressure inside the carcass.

All the portions listed above must be made as impermeable as possible to oxygen.

The innerliner must confine the oxygen as far possible inside the carcass, and prevent it from diffusing inside and degrading the compounds from which the other parts of the tyre are made.

As regards the tyre portions incorporating metal reinforcing cords, correct adhesion of the polymer base of these portions to the cords embedded in them is essential to ensure correct performance of the tyre. In fact, the working life of a tyre may be impaired by a reduction in adhesion of the polymer base to the cords.

Oxidation-induced degradation of these portions has been found to have a negative effect precisely on adhesion of the polymer base to the cords, and to eventually result in detachment of the polymer base.

The compounds from which the innerliner is made normally have a matrix of isobutyl rubber.

As is known, the tyre industry needs to make increasingly thin impermeable layers, known as innerliners, but without impairing performance in terms of impermeability. A thinner innerliner mainly means less material is used, which has obvious advantages in terms of production, and in reducing tyre weight, overall energy consumption of the vehicle, and rolling resistance.

One way of enhancing the impermeability of the innerliner without necessarily making it thicker is to use special fillers in the compound, which, when appropriately mixed, form a steric hindrance that greatly improves the impermeability of the innerliner as the end product. In other words, when mixed with the polymer base, fillers such as clay, kaolin, mica, etc. form an air barrier in the end product, preventing air from flowing through the product and so improving its impermeability. In this connection, it is important to note that any anisotropy of the filler may even further improve the impermeability of the rubber.

Another solution is to add polymer materials with a high glass transition (Tg) to the compound. A typical example is PET, widely used in the food and drink packaging industry.

Using conventional technology, however, mechanically bonding the fillers or high Tg polymers, such as PET, to rubber often poses serious problems.

Oxygen diffusion inside portions incorporating metal reinforcing cords may be prevented by increasing the thickness of the innerliner to form a better oxygen barrier. As stated, however, this solution has the drawback of invariably increasing rolling resistance and production cost.

Another solution is to use materials that improve adhesion of the compound to the cords by reducing the effect of oxidation-induced degradation. In the case of metal cords, for example, the presence of oxygen, in addition to degrading the rubber through oxidation, also oxidizes the metal, thus aggravating detachment of the polymer base from the cords. In these cases, cobalt salts are known to be used in the compounds as adhesion promoters, but these have the drawback of increasing tyre production cost.

DISCLOSURE OF INVENTION

The Applicant has discovered that using a particular class of chemical compounds in compounds for innerliners or portions incorporating metal cords provides for enhancing impermeability to oxygen and so providing a solution to the above problems.

It is an object of the present invention to provide a tyre portion selected from the group comprising an innerliner, tread ply skim, TBR body ply skim, bead reinforcing skim, undertread, tie gum, squeegee, folded edge gum strip, belt edge gum strip and tread ply insert, and made from a compound comprising a polymer base and curing agents; said tyre portion being characterized in that said compound comprises a carbohydrate comprising 2 to 30 repetitive, possibly substituted, units.

Preferably, said carbohydrate comprises monomer units of 5 or 6 carbon atoms; more preferably, said monomer units of carbohydrate are in the group comprising ribose, dioxyribose, arabinose, xylose, glucose, galactose, mannose, mannitol, allose, fructose, sorbitol and sucrose.

Preferably, said monomer units are mono- or polysubstituted; more preferably, said monomer units are replaced with carboxyl groups and their derivatives, phenyl groups and their derivatives, benzoic groups and their derivatives, Preferably, said carbohydrate is sucrose benzoate.

Preferably, the compound comprises 0.05 to 10 phr, and more preferably 0.5 to 5 phr, of said carbohydrate.

A further object of the present invention is a tyre comprising one of said portions.

Yet a further object of the present invention is use of a carbohydrate, comprising 2 to 30 repetitive, possibly substituted, units, in compounds of a tyre portion in the group comprising an innerliner, tread ply skim, TBR body ply skim, and bead reinforcing skim.

BEST MODE FOR CARRYING OUT THE INVENTION

Examples

Two sets of examples were produced: a first set of compounds for producing innerliners; and a second set of compounds for producing belt skims.

The compounds below were produced using a standard procedure not pertinent to the present invention.

Compound Production (First Mixing Step)

Before commencing the mixing stage, a 230-330-liter, tangential-rotor mixer was loaded with the polymer base and all the other ingredients, except for sulphur, zinc oxide and accelerants, to a fill factor of 66-72%.

The mixer was operated at a speed of 40-60 rpm, and the resulting mix unloaded on reaching a temperature of 140-160° C.

(Second Mixing Step)

The mix from the first step was mixed again in the mixer operated at a speed of 40-60 rpm, and was unloaded on reaching a temperature of 130-150° C.

(Third Mixing Step)

The curing system, comprising sulphur, accelerants and zinc oxide, was added to the mix from the second step, to a fill factor of 63-67%.

The mixer was operated at a speed of 20-40 rpm, and the resulting mix unloaded on reaching a temperature of 100-110° C.

First Set of Examples

Two compounds were produced with typical innerliner compound compositions. One of the two compounds (Compound A) was produced in accordance with the present invention, and therefore containing a carbohydrate designed to react with molecular oxygen and prevent it from diffusing inside the compound.

More specifically, the carbohydrate used was sucrose benzoate.

The other compound (Compound B) was a control compound with the same composition as Compound A but containing no carbohydrate.

Table I below shows the compositions in phr of the above innerliner compounds.

TABLE I

|  | Compound A | Compound B |
| --- | --- | --- |
| Halobutyl rubber | 100 |  |
| Carbon black | 50 |  |
| Clay | 40 |  |
| Stearic acid | 1 |  |
| Zinc oxide | 2 |  |
| Oil | 10 |  |
| Sulphur | 1 |  |
| Accelerant | 2 |  |
| Sucrose benzoate | 1 | — |

The carbon black used was N660.

The accelerant used was dibenzothiazyl disulphide.

As shown by the compositions in Table I, the control innerliner compound differs from the innerliner compound according to the invention simply by containing no carbohydrate.

From the two compounds in Table I, respective cured-rubber specimens were made, each with the same characteristics as the innerliner made from the same compound.

The specimens were tested for oxygen impermeability under different operating and material treatment conditions.

More specifically, oxygen impermeability was measured on 0.7 mm thick materials, using a conventional apparatus such as a MOCON® OX-TRA® (model 2/61).

The oxygen impermeability tests performed are shown below. Each test result is indexed to that of the control compound (Compound B) specimen. The higher the indexed value, the greater the impermeability to oxygen.

A first set of oxygen impermeability measurements was performed by subjecting the Compound A and B specimens to different temperature conditions (25° C., 35° C., 45° C.). The results are shown in Table II.

TABLE II

| T (° C.) | Specimen from compound A | Specimen from compound B |
| --- | --- | --- |
| 25 | 124 | 100 |
| 35 | 116 | 100 |
| 45 | 110 | 100 |

A second set of measurements was performed on the Compound A and B specimens subjected first to a first ageing process, in which the specimens were kept in an oven at 70° C. for three and seven days. The measurements of the aged specimens were made at a temperature of 25° C. The results are shown in Table III.

TABLE III

|  | Specimen from compound A | Specimen from compound B |
| --- | --- | --- |
| 3 days | 126 | 100 |
| 7 days | 120 | 100 |

A third set of measurements was performed on the Compound A and B specimens subjected first to a second, more stringent, ageing process, in which the specimens were kept in an oven at 70° C. for one, three, and seven days in the presence of 70% relative humidity and 0.45 bar partial oxygen pressure. These conditions serve to simulate more critical markets in terms of environment. The measurements were made at a temperature of 25° C.

The results are shown in Table IV.

TABLE IV

|  | Specimen from compound A | Specimen from compound B |
| --- | --- | --- |
| 1 days | 115 | 100 |
| 3 days | 114 | 100 |
| 7 days | 110 | 100 |

As shown clearly in Tables II, III and IV, the innerliner specimen according to the present invention shows a far greater impermeability to oxygen than the control innerliner specimen, which only differs by having no oxygen-reacting chemical compound. The impermeability test results therefore confirm the ability of chemical compounds, designed to react with molecular oxygen, to make the innerliner more impermeable to oxygen.

It is important to note how the improvement in impermeability to oxygen persists even under high-temperature and ageing conditions.

By making it more impermeable to oxygen, the innerliner may therefore be made thinner, with all the advantages this affords in terms of material saving and reducing tyre weight and rolling resistance.

Second Set of Examples

Two belt skim compounds were produced: a compound (Compound C) in accordance with the invention and comprising sucrose benzoate as the oxygen-reacting chemical compound; and a control compound (Compound D) with no oxygen-reacting sucrose benzoate.

Table V shows the compositions in phr of Compounds C and D, which were made using the same process, not pertinent to the present invention.

TABLE V

|  | Compound C | Compound D |
| --- | --- | --- |
| Natural rubber |  | 100.00 |
| Carbon black |  | 60.00 |
| Stearic acid |  | 2.00 |
| Zinc oxide |  | 10.00 |
| Antioxidant |  | 2.00 |
| Cobalt salt |  | 0.90 |
| Sulphur |  | 9.00 |
| Accelerant |  | 2.00 |
| Sucrose benzoate | 1.00 | — |

The following are ingredient specifications not shown in the Table.

Carbon black: N330.

Antioxidant: N-1,3-dimethylbutyl-N'-phenyl-paraphenylenediamine (6PPD)

Cobalt salt: cobalt neocaprate

Accelerant: benzothiazyl-2-dicyclohexyl sulphonamide (DCBS)

Respective cured-rubber specimens with embedded metal cords were made from Compounds C and D in Table V.

The cord-rubber specimens were aged in an oven at 60° C., in the presence of 85% relative humidity and 0.2 bar partial oxygen pressure, to simulate critical cord-compound adhesion conditions in terms of environment.

Compound-to-cord adhesion was assessed by quantifying the cord percentage still covered with rubber after the two parts of the cord-rubber composite were separated by applying a load. The measurements were made at a temperature of 25° C.

More specifically, rubber-to-cord adhesion was calculated according to the number of days the specific cord-rubber composite was aged. More specifically, the number of days' ageing necessary to bring about a 50% reduction in rubber-to-cord adhesion was calculated.

The findings showed that reducing rubber-to-cord adhesion by 50% took 4.2 days for the Compound D specimen, as compared with 5.0 days for the Compound C specimen.

The findings confirm a 20% increase in rubber-to-cord adhesion due to the presence of sucrose benzoate.

This demonstrates how the presence of a carbohydrate is capable of preventing oxygen diffusion and, therefore, rubber degradation and consequent rubber detachment from the cords.

Finally, achieving a tyre portion guaranteeing very little oxygen diffusion makes it possible to reduce the thickness of the portion and the presence of chemical compounds such as adhesion promoters, with obvious advantages in terms of rolling resistance and manufacturing cost.

The invention claimed is:

1. A tyre portion made from a compound comprising a polymer base, curing agents and sucrose benzoate; wherein the tyre portion is selected from the group consisting of innerliner, tread ply skim, TBR body ply skim, bead reinforcing skim, undertread, tie gum, squeegee, folded edge gum strip, belt edge gum strip and tread ply insert.

2. A tyre portion as claimed in claim 1, wherein the compound comprises 0.05 to 10 phr of sucrose benzoate.

3. A tyre portion as claimed in claim 1, wherein the compound comprises 0.5 to 5 phr of sucrose benzoate.

4. A tyre comprising at least one portion as claimed in claim 1.

* * * * *